(12) United States Patent
Sap et al.

(10) Patent No.: US 7,125,027 B2
(45) Date of Patent: Oct. 24, 2006

(54) COMPOUND STEERING MECHANISM (75) Inventors: Bruno Sap, La Chapelle Aux Pots (FR); Matthieu Delamare, Renneville (FR); Andre Rateau, Francastel (FR); Francois Pottier, St. Martin le Noeud (FR)

(73) Assignee: AGCO SA, Beauvais (FR)

( * ) Notice: Subject to any disclaimer, the term of this patent is extended or adjusted under 35 U.S.C. 154(b) by 369 days.

(21) Appl. No.: 10/655,234

(22) Filed: Sep. 4, 2003

(65) Prior Publication Data
US 2004/0080134 A1 Apr. 29, 2004

(30) Foreign Application Priority Data
Sep. 7, 2002 (GB) .................................. 0220866.8

(51) Int. Cl.
*B60G 9/02* (2006.01)

(52) U.S. Cl. .......................... 280/124.114; 280/124.11; 280/124.112; 280/124.117; 280/124.121; 280/124.122

(58) Field of Classification Search ......... 280/124.113, 280/124.114, 124.111, 124.11, 124.112, 124.116, 280/124.117, 124.121, 124.122
See application file for complete search history.

(56) References Cited

U.S. PATENT DOCUMENTS 5,046,577 A 9/1991 Hurlburt
5,312,123 A 5/1994 Hurlburt
6,719,476 B1 * 4/2004 Hisi ........................... 403/137

FOREIGN PATENT DOCUMENTS

| DE | 1630721 | | 6/1971 |
|----|---------|---|--------|
| EP | 400033 | * | 9/1991 |
| EP | 0597515 | | 10/1993 |
| GB | 2309210 | | 7/1997 |
| WO | WO 89/07545 | | 8/1989 |

* cited by examiner

*Primary Examiner*—Eric Culbreth
(74) *Attorney, Agent, or Firm*—Troutman Sanders LLP; Gerald R. Boss

(57) ABSTRACT

An axle mounting assembly includes a steerable axle mounted on an axle support and having a pair of opposing steerable wheels pivotally connected to the respective transverse ends of said steerable axle for pivotal movement relative thereto about respective wheel pivot axes. A substantially rigid connecting member extends between and is attached to the axle support and a steerable element of the steerable axle. The steerable axle is attached to the axle support by first, second and third flexible couplings. Each coupling provides for three planes of movement, the first flexible coupling attaching the axle to the axle support rearward of said axle, the second flexible coupling attaching the axle to a first end of a link forward of said axle and the third flexible coupling attaching a second end of said link to said axle support upwardly of said axle.

10 Claims, 10 Drawing Sheets

COMPOUND STEERING MECHANISM

This application claims priority from UK Patent Application No. 0220866.8 filed on Sep. 7, 2002.

FIELD OF THE INVENTION

This invention relates to steering mechanisms for off highway vehicles, and in particular steering mechanisms for tractors permitting a decreased turning radius for the tractor.

BACKGROUND OF THE INVENTION

Most tractors, whatever their application, typically comprise a non-steerable driven axle, and a steerable axle, the wheels of which may or may not be driven.

In a typical arrangement the steerable axle is pivotally mounted to the tractor chassis to pivot about a generally horizontal axis. The front axle is thereby permitted to oscillate with respect to the chassis, so that the wheel may stay in contact with uneven ground.

A number of physical constraints are imposed on the range of movement of the steerable wheels. Physical constraints include tyre size, track setting, clearance between chassis and the end of the axle etc.

The maximum turning angle provides the smallest turning diameter for any particular tractor set up. In order to increase maneuverability of the tractor, designers have sought to increase the turning angle.

One solution to the problem of increasing turning axle has become known generally as compound steering. In a compound steering mechanism a decreased turning radius is achieved by moving the steering axle relative to the chassis at the same time as turning the steering wheels. By moving the axle relative to the chassis, the turning angle may be increased in two ways. First, in many compound steering mechanisms the axle moves through an arc so that instead of extending at 90 degrees to the longitudinal axis of the tractor, and direction of travel it extends of between 80–90 degrees to the direction of travel, depending on the direction of the steerable wheels. Second, by moving the axle relative to the chassis, the distance between an inner steerable wheel and the chassis is increased thereby permitting the maximum angle of the inner steerable wheel and the front axle to be increased.

An example of a compound steering mechanism is found in U.S. Pat. No. 5,046,577. In the steering mechanism described in U.S. Pat. No. 5,046,577, when the steerable wheels are turned relative to the steering axle simultaneously, the steering axle pivots relative to the chassis. A connecting link interconnects the pivot mechanism which pivotally connects the steering axle to the chassis, with the steering mechanism such that manipulation of the steering mechanism effects a turning of the wheels and a pivotal movement of the steering axle in the same direction the wheels are being turned. The pivot mechanism allows for pivotal movement of the steering axle about a longitudinally extending horizontal axis in addition to the pivotal movement of the steering axle about a generally vertical axis relative to the chassis. A lost motion linkage interconnecting the pivot mechanism and the steering axle accommodates differences in arcuate movements due to the pivot mechanism and the steering axle pivotally moving about longitudinally spaced pivot centres.

The compound steering mechanism of U.S. Pat. No. 5,046,577 is complex requiring a number of moving parts. Such a mechanism is both costly to manufacture and maintain.

Another compound steering arrangement is described in U.S. Pat. No. 5,312,123. In the compound steering arrangement described in this patent a steering axle is mounted on one surface which carries a vertical pivot and a ball joint which is connected to the tractor rearwardly of the steering axle. The front of the subframe is attached to the tractor by a yoke comprising a carrier member pivotally attached to the tractor and a pair of dog bone links, each link being attached to the carrier member and the axle. The assembly provides for pivotal movement of the steering axle relative to the chassis by a four bar linkage so that the tractor chassis maintains a substantially uniform elevation relative to the steering axle throughout the range of movement of the steerable axle. This compound steering mechanism requires many moving component parts and as such is expensive to manufacture and maintain.

Another compound steering arrangement is described in European Patent 0400033. The arrangement comprises a tubular drag link which at one end is rigidly attached to the steering axle, and at its other end is attached to the tractor chassis by means of a ball joint, the ball joint being rearward of the steering axle. The maximum turning angle is further enhanced by positioning the steerable axle such that during a turn the front of the tractor chassis. The practice of positioning the front axle such that during a turn the front of the outside turning wheel moves in front of the front end of the tractor chassis is not unique to compound steering arrangement. Many agricultural tractors have this feature.

The front of the steerable axle is also connected to the tractor chassis by either a pair of pivotable springs or control arm.

The arrangement described in European Patent 0400033 requires a costly tubular pole type drag link and modification to the tractor chassis to accommodate said drag link. Furthermore, the length of the drag link places design limitations on the provision of drive to the front axle. Also, the length of the drag link may improve stability problems.

It would therefore be desirable to provide an improved compound steering mechanism.

BRIEF DESCRIPTION OF THE DRAWINGS

In the drawings which illustrate a preferred embodiment of the invention, by way of example only.

DETAILED DESCRIPTION OF THE PREFERRED EMBODIMENTS

Figure 1:
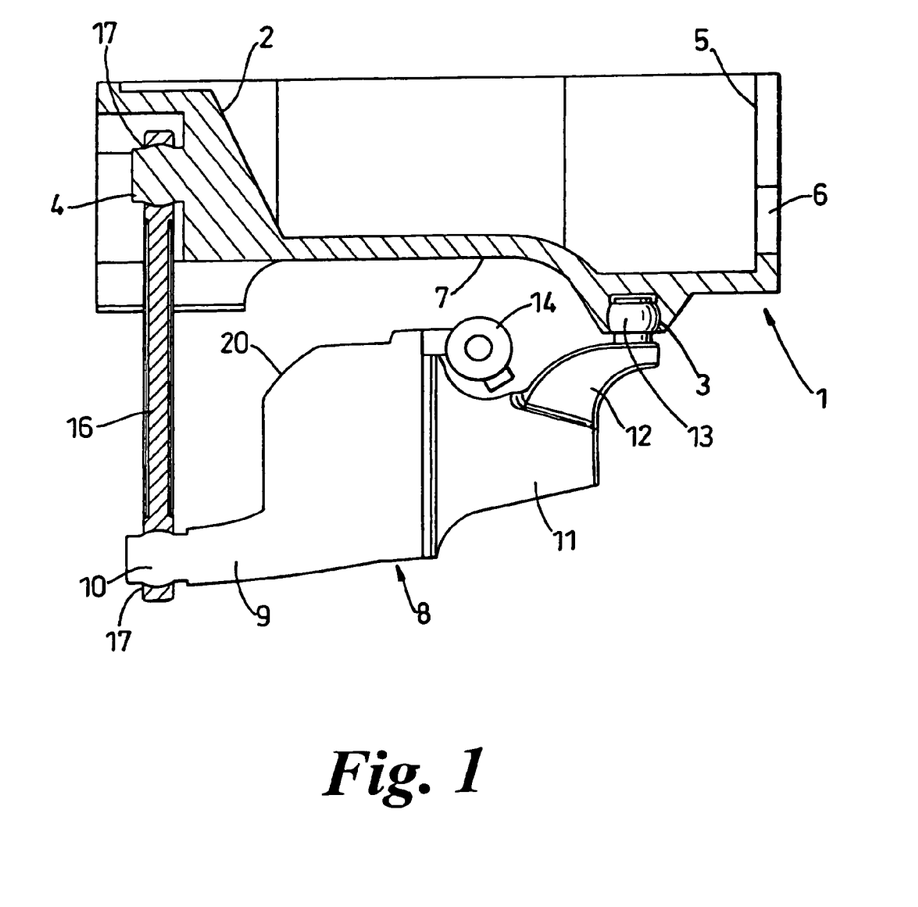
FIG. 1 is a side view in partial cross-section of an assembly according to an embodiment of the invention.

Referring to FIG. 1, there is shown an axle mounting assembly, which provides for compound steering.

The assembly comprises a front axle support 1. In the example the front axle support 1 is cast in metal.

The front axle support 1 includes a rear wall 5 having a plurality of apertures 6. The front axle 1 support is attached to the next component of the vehicle chassis (which may be a subframe or the stressed sump of an engine) by means of bolts or pins passing through said aperture 6.

The front end of the front axle support includes a housing 2 which includes a ball portion 4 of a ball and socket joint the socket part 17 of said joint being formed in one end of a link 16.

The axle 8 comprises an axle casing 20 on the ends of which are mounted steerable wheel hubs 23, said hubs 23 being mounted on said axle casing by king pins 22.

Figure 6:
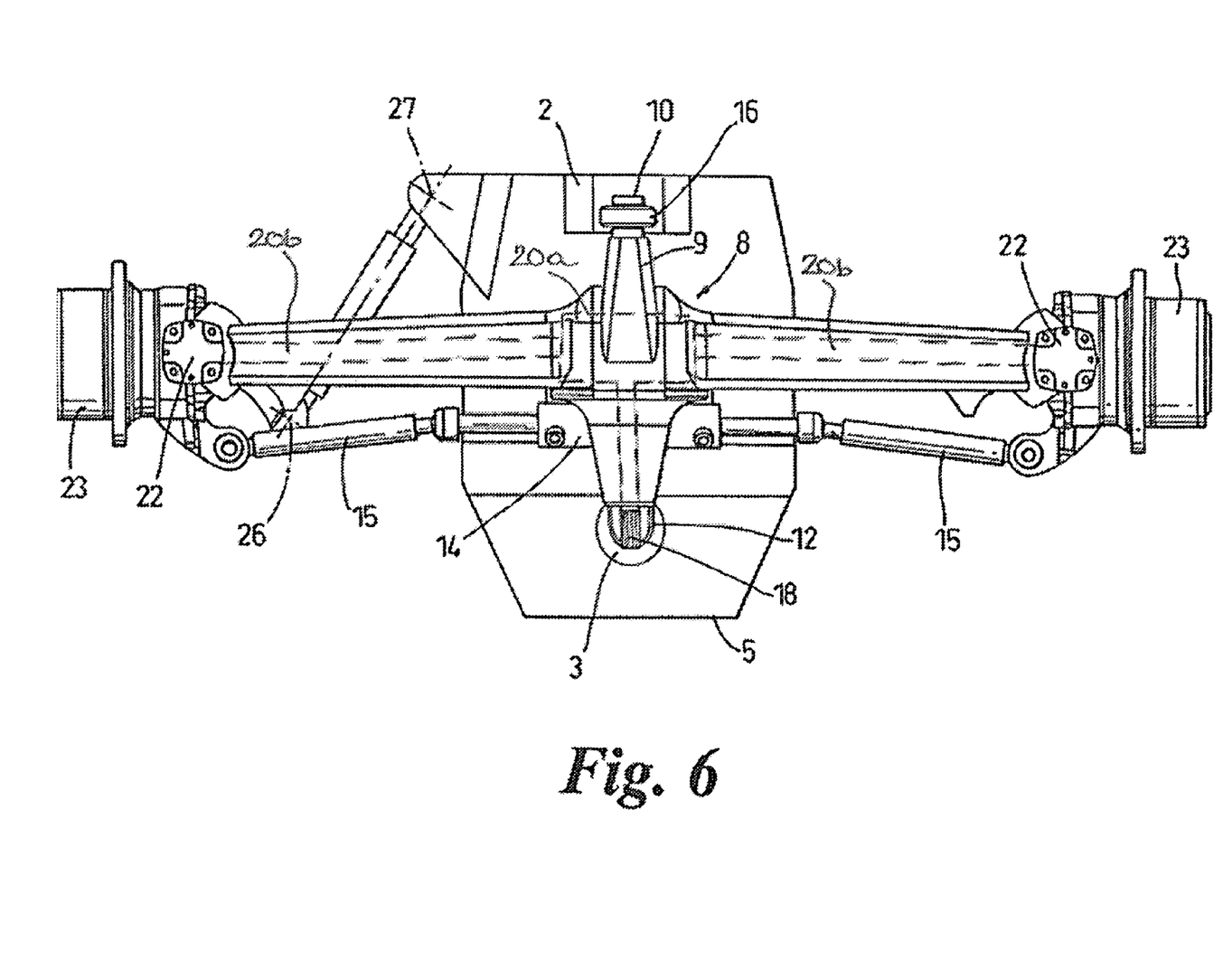
FIG. 6 is a view of the underside of the assembly show in FIG. 2.
Figure 7:
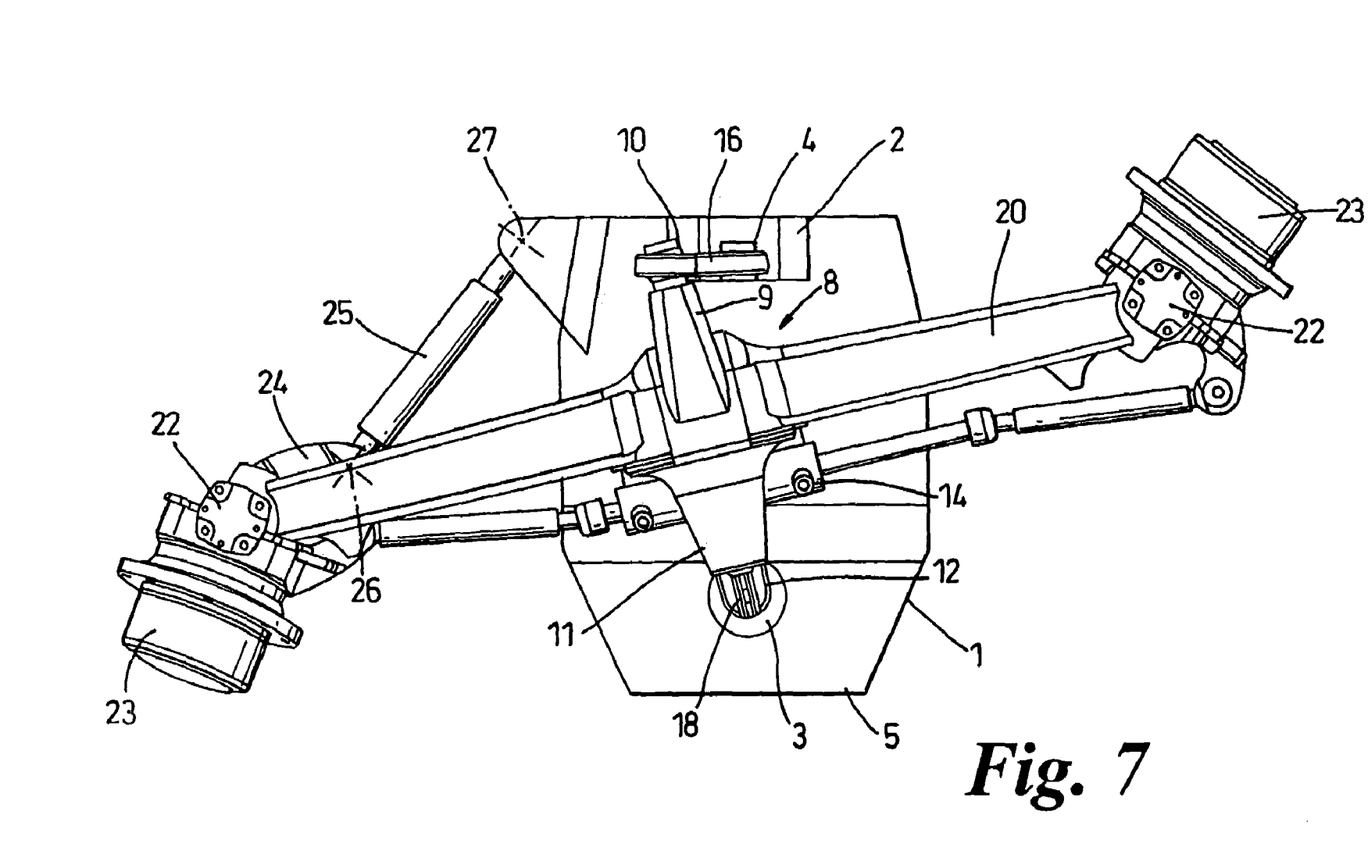
FIG. 7 is a view of the underside of the assembly shown in FIG. 3.

To the rear of the front axle support 1, and on the underside thereof there is located the socket part 3 of a ball and socket joint the ball part 13 of the joint being arranged on a mount 12 extending from an input drive shaft housing 11, which supports an input shaft 18 (see FIGS. 6 and 7) and is itself attached to an axle casing 20. Shaft 18 is substantially aligned with the longitudinal axis of the associated vehicle when the wheels are in the straight ahead position and drives the wheel hubs 23 cenatly at 20*a* drive shafts 20*b* within housing 20 which are shown diagrammically or schematically in dotted detail FIG. 6.

A mount 9 extends forward from the front face of the axle casing 20 and mounts the ball part 10 of a ball and socketjoint. The socket part 17 of the joint is formed in the other end of the previously mentioned link 16.

Preferably each ball and socket joint includes an elastically compressible member, such as a rubber block.

The manner in which the compound steering arrangement functions will now be described with reference to FIGS. 1 to 6.

Figure 2:
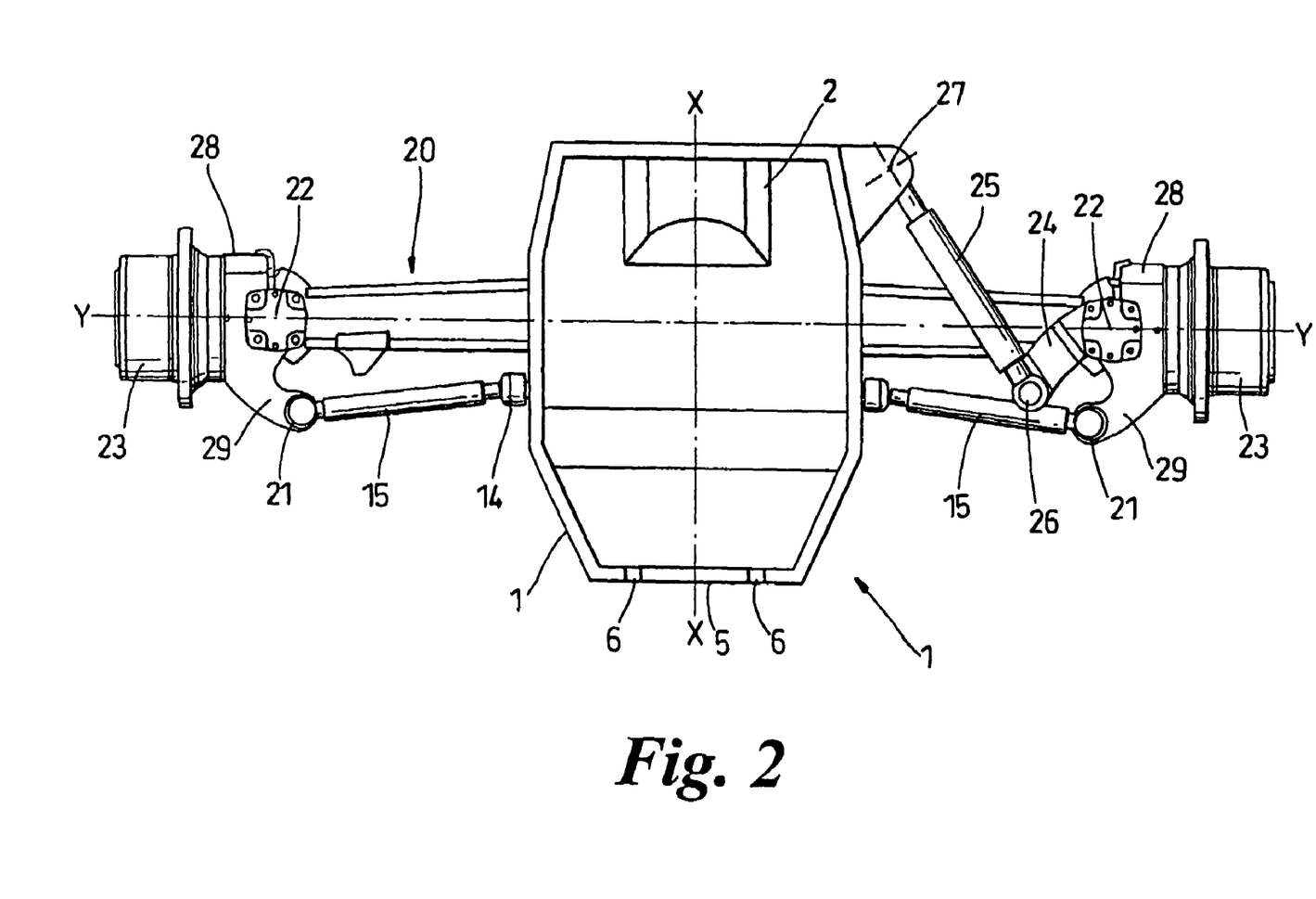
FIG. 2 is a plan view of an assembly according to an embodiment of the invention.

Looking first at FIG. 2, the front axle support 1 has attached thereto a first bracket 27 to which is attached one end of a link 25. The other end of the link 25 is attached to a second bracket 24 which is itself attached to the steerable wheel hub mount 28.

Figure 3:
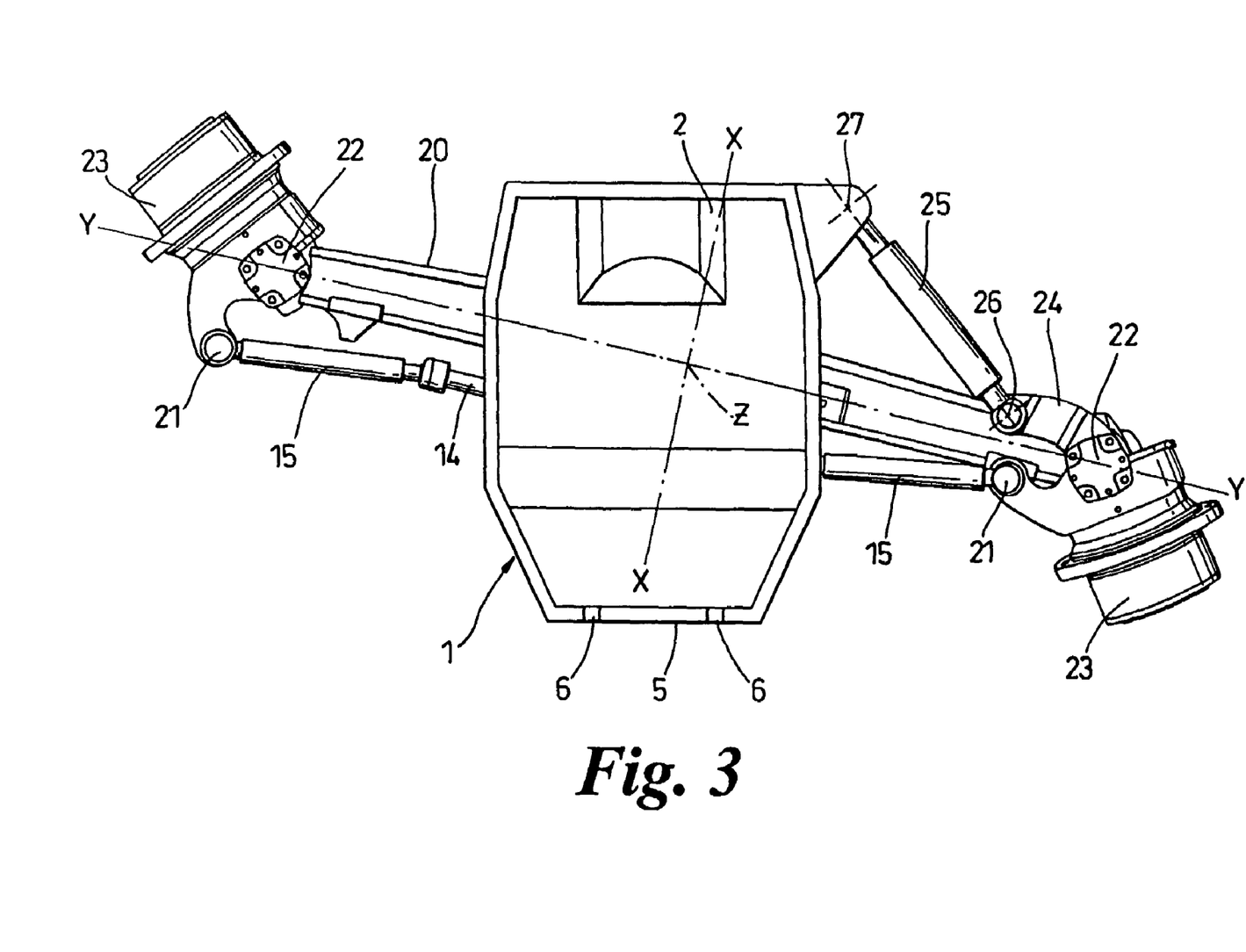
FIG. 3 is a plan view of the assembly shown in FIG. 2, with the steering wheels turned through an angle.
Figure 4:
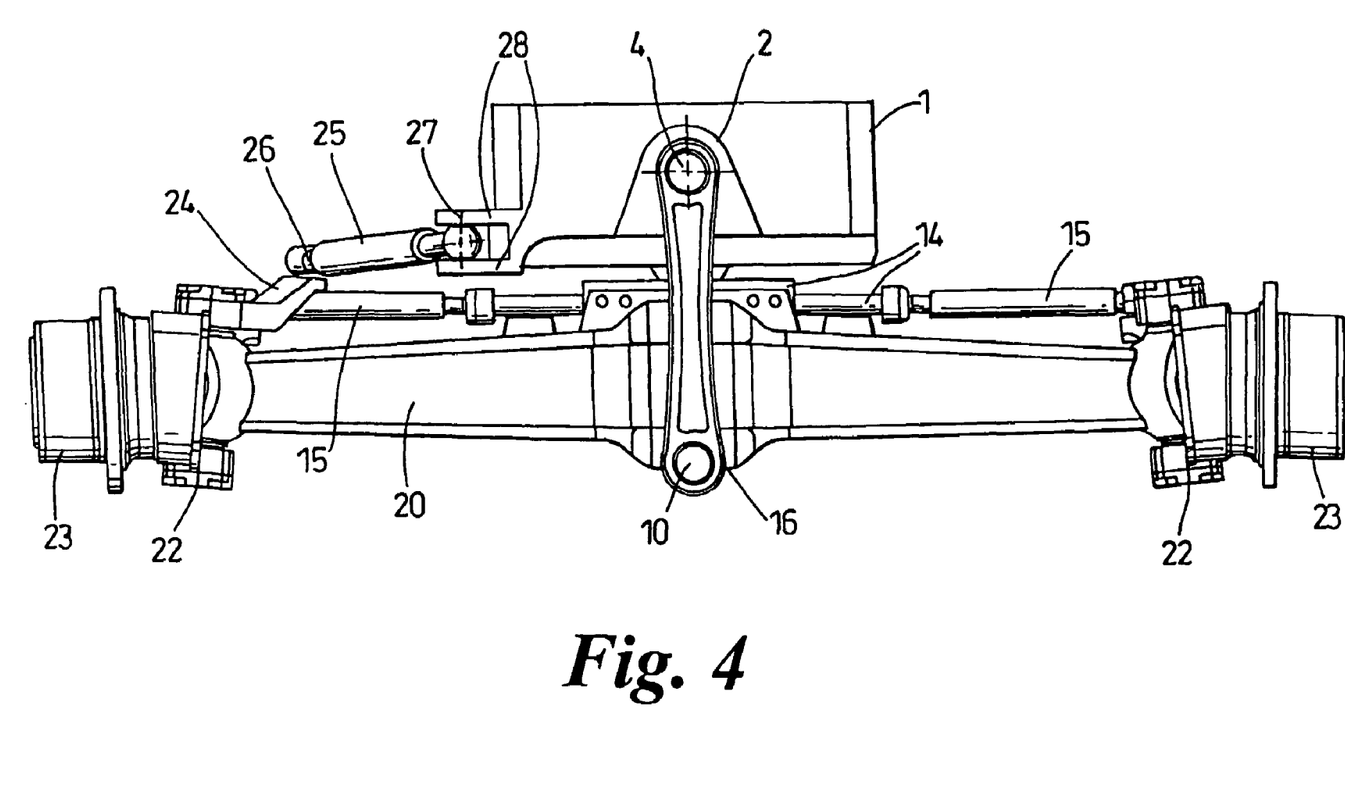
FIG. 4 is a front view of the assembly shown in FIG. 2.

Also attached to the steerable wheel hub mounts 28 are brackets 29. One end of a track rod 15 is attached to a bracket 29 by a ball and socket joint 21, with the other end of the track rod 15 being attached to a piston of a hydraulically actuated piston and cylinder steering ram 14. FIG. 3 illustrates the exemplary mounting axle assembly executing right turn. It can be seen that the axis Y—Y of the steerable axle 8 has moved from being substantially perpendicular to the longitudinal axis of the front axle support 1 to being angularly displaced with respect to said longitudinal axis.

Furthermore, the center point Z of the axle 8 has moved sideways to the right, as compared to FIG. 2, where the wheels are set to provide a substantially straight travel path. This sideways movement of the axle 8 is caused by the link 25 which is substantially rigid. As the arm 14 is moved to the left, the wheel hub 23 and its mount 29 pivot about the king pin 22 causing the bracket 24 to move through an arc. Since both the links 25 and bracket 24 are substantially rigid, the distance between the bracket 27 and the king pin 22 must increase, thereby shifting the axle 8 sideways.

Figure 5:
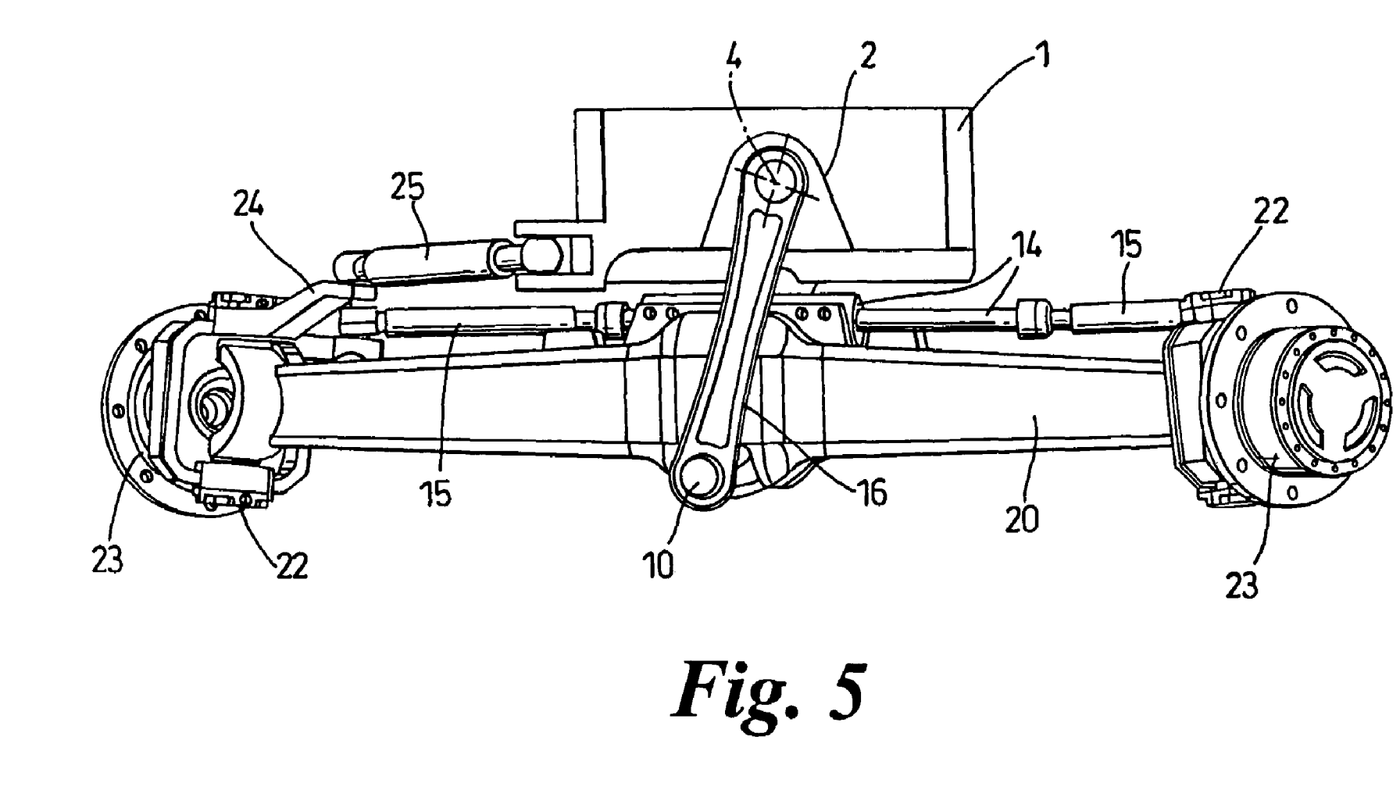
FIG. 5 is the front view of the assembly shown in FIG. 3.

FIG. 5 illustrates how the link 16 moves during a turn. Also, it can be understood from FIG. 5 that as the axle 8 moves away from the central position shown in FIG. 4 to that shown in FIG. 5, the distance between the axle 8 and the axle support 1 decreases.

This decrease in distance is accommodated by the shape of underside of the front axle support which includes a recess 7 to provide additional clearance.

Figure 8:
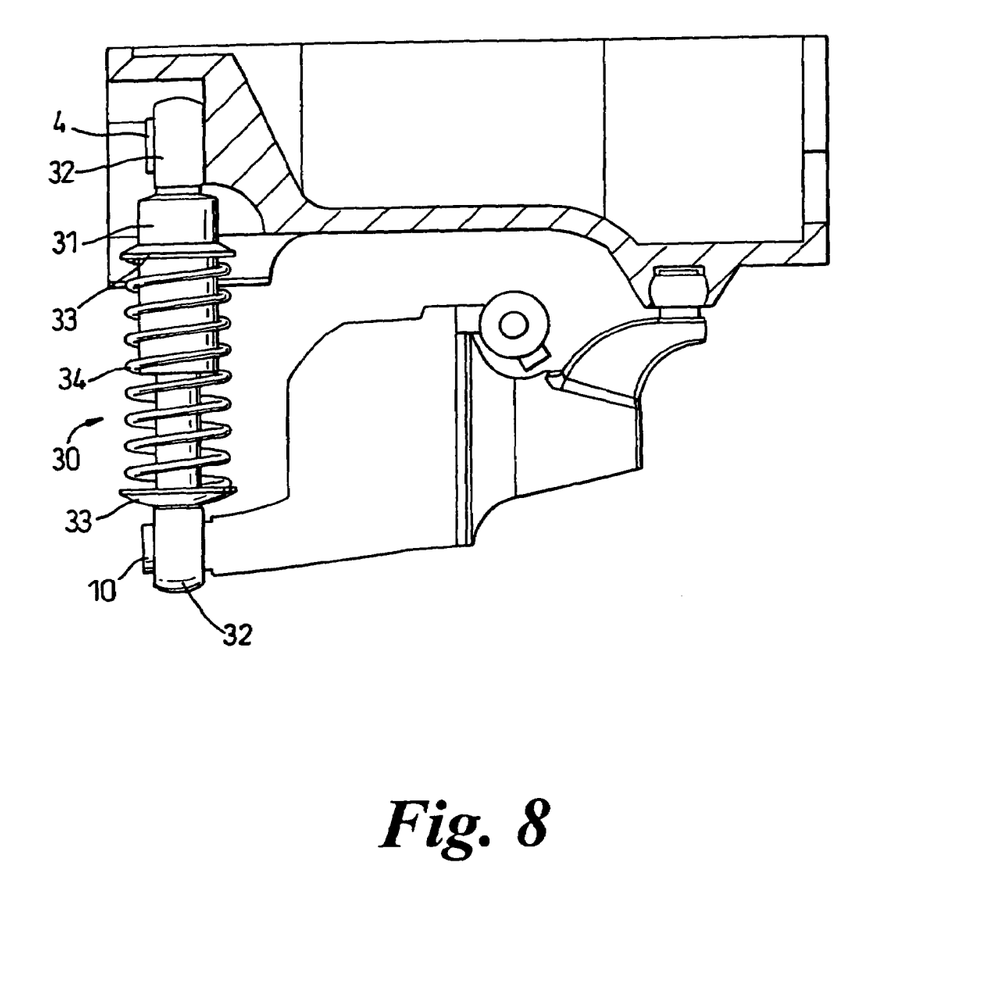
FIG. 8 is a side view in partial cross-section of an assembly according to the embodiment of the invention.
Figure 9:
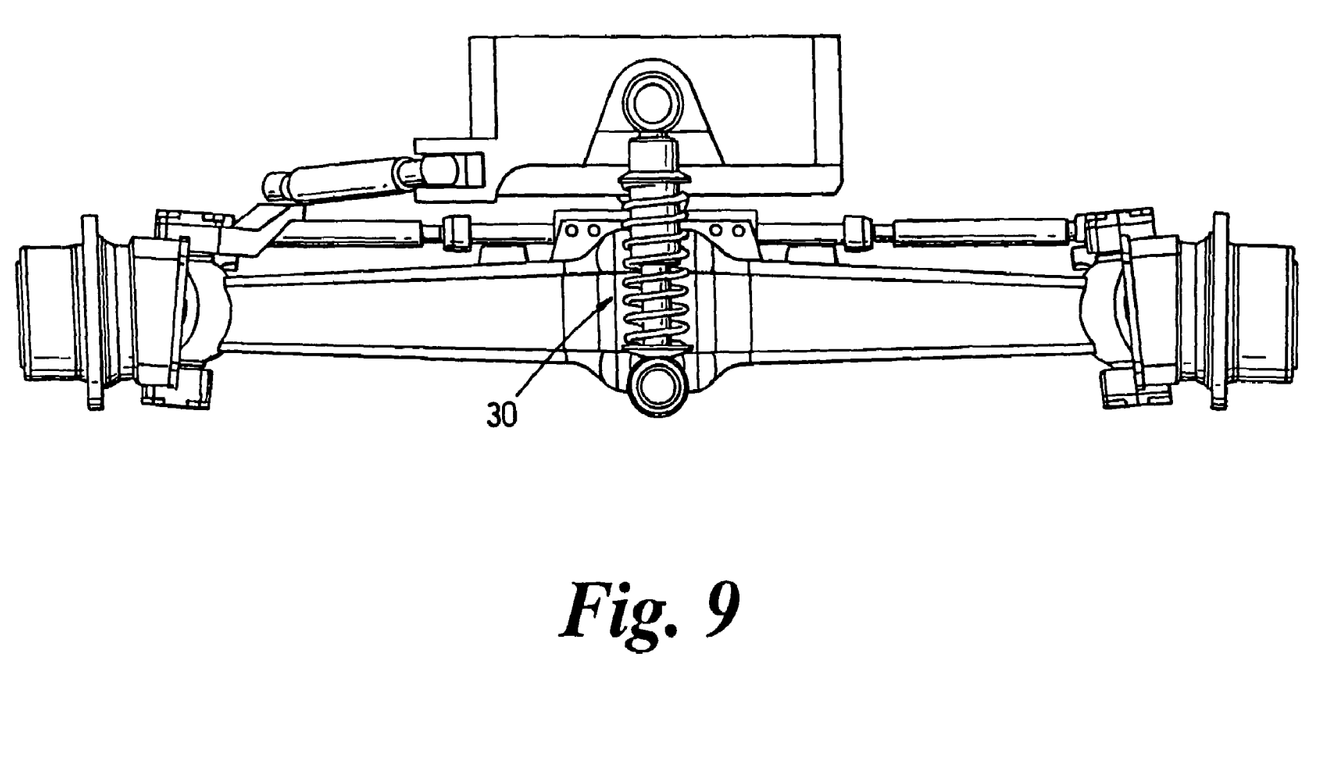
FIG. 9 is a front view of the assembly shown in FIG. 8.
Figure 10:
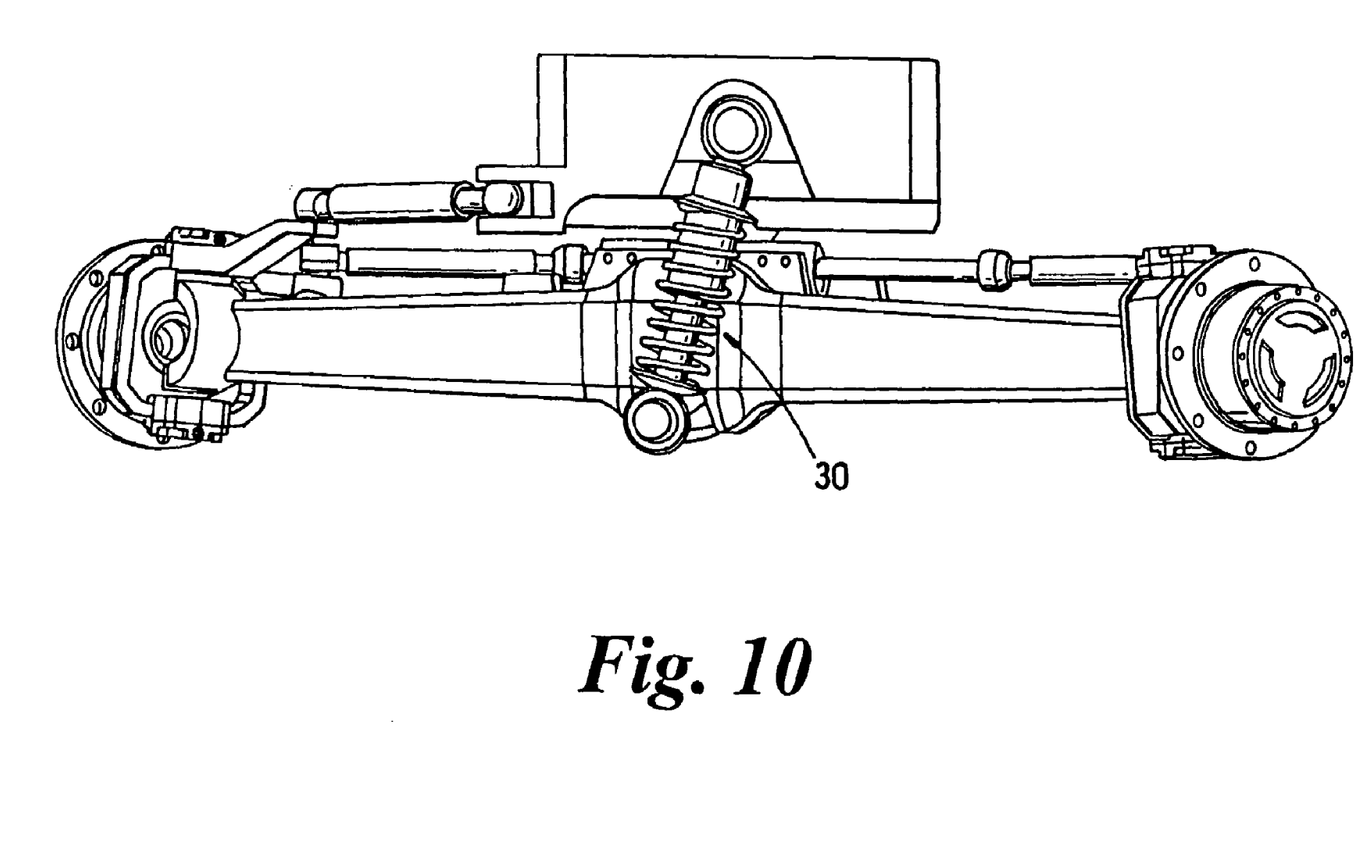
FIG. 10 is a view of the embodiment shown in FIG. 9 with the steering wheels turned through an angle.

The embodiment shown in FIGS. 8 to 10 of the drawings is a modification providing a front axle suspension. The rigid link 16 is replaced by a suspension member 30, the suspension member comprising a damper 31, opposite ends of which comprise sockets 32 which co-operate with ball parts 4, 10 in the same manner as described with reference to FIGS. 1 to 7. Each of the two halves of the damper 31 comprises a spring retaining member 33 with a coil spring 34 being located between said members 33 and around the damper 31.

With regard to the links 25, they may be of a type which can be adjusted in length either manually or hydraulically. Such types of link are well known in the art and may be required to provide for adjustments to track width or tyre size.

The invention provides a very simple arrangement which is self contained insofar as all the components of the assembly are mounted on the axle support. As such very little modification to the vehicle is required. Also, very few components are used, resulting in the assembly being relatively inexpensive to manufacture and maintain.

We claim:

1. A vehicle steerable and driven axle mounting assembly comprising:
a steerable axle having a pair of opposing steerable elements pivotally connected to the respective transverse ends of a casing of said steerable axle for pivotal movement relative thereto about respective pivot axes;
drive shafts extending within the casing to each respective steerable element from a casing input shaft located in a central region of the casing;
an axle support;
a substantially rigid connecting member extending between and attachable to the axle support and a said steerable element of said steerable axle;
wherein the steerable axle is attached to the axle support by first, second and third flexible couplings, each coupling providing for three planes of movement, the first flexible coupling attaching the axle casing to the axle support rearward of said axle, the second flexible coupling attaching the axle casing to a first end of a link forward and downwardly of said axle casing and the third flexible coupling attaching a second end of said link to said axle support upwardly and forwardly of said axle casing, and steering actuator means for steering acting between a said steerable element of the steerable axle and the axle casing.

2. An assembly according to claim 1, wherein said first flexible coupling is located upward and rearward of the said axle casing.

3. A vehicle steerable and driven axle mounting assembly comprising:
a steerable axle having a pair of opposing steerable elements pivotally connected to the respective transverse ends of a casing of said steerable axle for pivotal movement relative thereto about respective pivot axes;
drive shafts extending within the casing to each respective from a casing input shaft located in a central region of the casing;
an axle support;
a substantially rigid connecting member extending between and attachable to the axle support and a said steerable element of said steerable axle;
wherein the steerable axle is attached to the axle support by first, second and third flexible couplings, each coupling providing for three planes of movement, the first flexible coupling attaching the axle casing to the axle support rearward of said axle, the second flexible coupling attaching the axle casing to a first end of a link forward of said axle casing and the third flexible coupling attaching a second end of said link to said axle support upwardly of said axle casing, the link including a suspension damping means to suspend the axle casing from the axle support, and steering actuator means for steering acting between a said steerable element of the steerable axle and the axle casing.

4. An assembly according to claim 3 wherein the axle casing includes forwardly and rearwardly thereon flexible coupling mounts, the mounts forming at least a part of said second and first flexible coupling respectively.

5. An assembly according to claim 4 wherein said rearward flexible coupling mount extends from a part of the casing which supports the input shaft.

6. An assembly according to claim 5 wherein said rearward flexible mount extends upward and rearward from axle casing.

7. An assembly according to claim 3 wherein the suspension damping means includes a spring.

8. An assembly according to claim 3 wherein the suspension damping means includes a damper.

9. An assembly according to claim 3 wherein one or more of said three flexible couplings is a ball and socket connector.

10. A vehicle including a steerable and driven axle mounting assembly according to claim 3.

* * * * *